(12) United States Patent
Zhang et al.

(10) Patent No.: US 12,448,918 B2
(45) Date of Patent: Oct. 21, 2025

(54) DIFFUSER WITH PASSLETS (71) Applicant: General Electric Company, Schenectady, NY (US)

(72) Inventors: Juntao Zhang, Mason, OH (US); Nicholas R. Overman, Sharonville, OH (US); Steven C. Vise, Loveland, OH (US); Andrew Wickersham, Liberty Township, OH (US); Michael A. Benjamin, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/662,535

(22) Filed: May 9, 2022

(65) Prior Publication Data
US 2023/0358170 A1 Nov. 9, 2023

(51) Int. Cl.
F02C 7/00 (2006.01)
F02C 7/04 (2006.01)

(52) U.S. Cl.
CPC ............ *F02C 7/04* (2013.01); *F05D 2240/35* (2013.01)

(58) Field of Classification Search
None
See application file for complete search history.

(56) References Cited

U.S. PATENT DOCUMENTS

| 3,608,310 A | 9/1971 | Vaught |
| 4,796,429 A | 1/1989 | Verdouw |
| 5,339,622 A * | 8/1994 | Bardey ............... F01D 25/32 55/306 |
| 5,791,148 A * | 8/1998 | Burrus ............... F02C 7/224 60/749 |
| 5,924,288 A | 7/1999 | Fortuna et al. |
| 6,272,865 B1 | 8/2001 | Clark et al. |
| 6,334,297 B1 * | 1/2002 | Dailey ................ F23R 3/04 60/785 |
| 6,357,237 B1 * | 3/2002 | Candy ................ F23R 3/28 60/737 |
| 6,530,223 B1 * | 3/2003 | Dodds ................ F23R 3/286 60/746 |
| 9,587,831 B2 | 3/2017 | Jause et al. |
| 10,208,664 B2 | 2/2019 | Armit et al. |
| 11,175,042 B2 | 11/2021 | Armit et al. |
| 2013/0145766 A1 * | 6/2013 | Hawie ................ F23R 3/16 60/740 |

(Continued)

FOREIGN PATENT DOCUMENTS

| EP | 3109548 B1 | 4/2021 |
| GB | 2391297 A | 2/2004 |

OTHER PUBLICATIONS

Wikipedia, Combustor, 2015 (Year: 2015).*

*Primary Examiner* — Edwin Kang
(74) *Attorney, Agent, or Firm* — Venable LLP; Michael C. Sanko; Michele V. Frank (57) ABSTRACT A diffuser for a combustor of a turbomachine engine. The diffuser includes a body having a first annular surface and a second annular surface that define a passage, the passage being configured to cause air to flow along the passage to a first component of the combustor. The first annular surface includes an opening that is configured to cause air to flow in a direction away from the passage to a second component of the combustor.

17 Claims, 9 Drawing Sheets (56) References Cited

U.S. PATENT DOCUMENTS

| | | | |
|---|---|---|---|
| 2013/0145767 A1* | 6/2013 | Hawie | F23R 3/16 |
| | | | 60/757 |
| 2016/0169049 A1* | 6/2016 | Eastwood | F01D 25/24 |
| | | | 415/213.1 |
| 2016/0186661 A1* | 6/2016 | Smith | F23R 3/005 |
| | | | 60/728 |
| 2017/0248155 A1* | 8/2017 | Parker | F02C 6/08 |
| 2020/0109668 A1* | 4/2020 | Butcher | F02C 7/04 |
| 2020/0362724 A1* | 11/2020 | Binek | F23R 3/54 |
| 2020/0370567 A1* | 11/2020 | Duong | F04D 17/10 |

* cited by examiner

FIG. 9 ary engines.
DIFFUSER WITH PASSLETS

TECHNICAL FIELD

The present disclosure relates to combustors of turbomachine engines. More specifically, the present disclosure relates to a diffuser with passlets to improve guidance of high-pressure flow within the combustor.

BACKGROUND

Advanced designs for turbomachine engines require higher performance to maintain a similar weight and size envelope compared to legacy engines. The length of the diffuser in the combustor is one of the major drivers for turbomachine engine core length. The weight benefit of reducing diffuser length is significant for both commercial and military engines.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "fore" (or "forward") and "aft" refer to relative positions within a gas turbine engine or vehicle, and refer to the normal operational attitude of the gas turbine engine or the vehicle. For example, with regard to a gas turbine engine, forward refers to a position closer to an engine inlet and aft refers to a position closer to an engine nozzle or exhaust.

The terms "outer" and "inner" refer to relative positions within a turbomachine engine, from a centerline axis of the engine. For example, outer refers to a position farther from the centerline axis and inner refers to a position closer to the centerline axis.

The terms "coupled," "fixed," "attached to," and the like, refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides the thrust using an electrically-powered motor(s), a heat engine such as a turbomachine, or a combination of an electrical motor(s) and a turbomachine.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, a two, a four, a ten, a fifteen, or a twenty percent margin in either individual values, range(s) of values, and/or endpoints defining range(s) of values.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed shaft" defines a component configured to operate at a rotational speed, such as a maximum allowable rotational speed, which is lower than that of a "high-speed shaft" of the engine. Alternatively, unless otherwise specified, these terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" may additionally, or alternatively, be understood to be relative to minimum allowable speeds and/or pressures, or minimum allowable speeds or maximum allowable speeds and/or pressures relative to, for example, normal, desired, steady state, operation.

One or more components of the turbomachine engine described below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of combustor cowls having unique features, configurations, thicknesses, materials, densities, passageways, headers, and mounting structures that may not have been possible or practical using prior manufacturing methods. Some of these features are described below.

This disclosure and various embodiments relate to a turbomachine engine, also referred to as a gas turbine engine, a turboprop engine, or a turbomachine. These turbomachine engines can be applied across various technologies and industries. Various embodiments may be described herein in the context of aeronautical engines and aircraft machinery.

In some instances, a turbomachine engine is configured as a direct drive engine. In other instances, a turbomachine engine can be configured as a geared engine with a gearbox. In some instances, a propulsor of a turbomachine engine can be a fan encased within a fan case and/or a nacelle. This type of turbomachine engine can be referred to as "a ducted engine." In other instances, a propulsor of a turbomachine engine can be exposed (e.g., not within a fan case or a nacelle). This type of turbomachine engine can be referred to as "an open rotor engine" or an "unducted engine."

Figure 1:
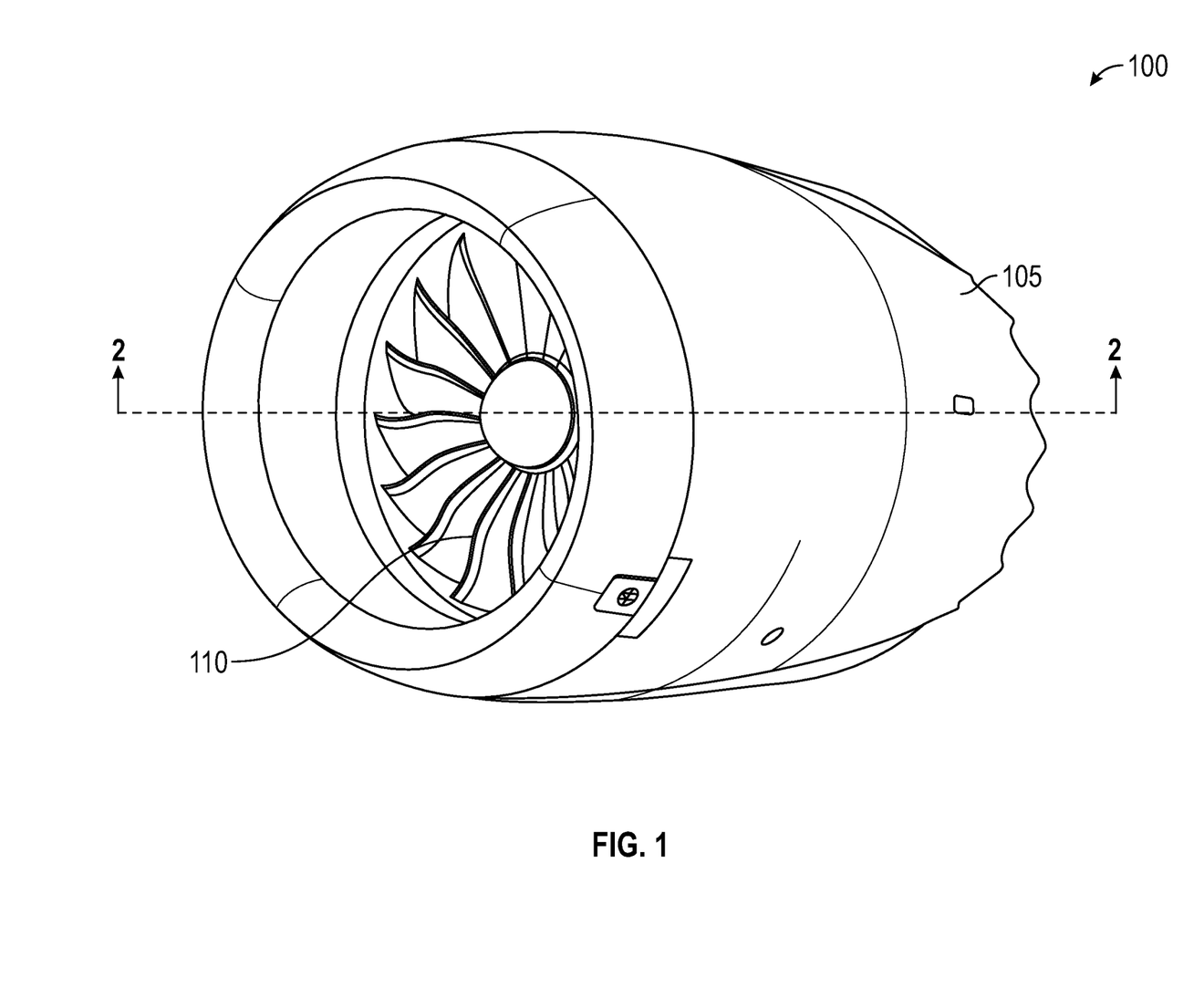
FIG. 1 shows an example of a turbomachine engine, according to an embodiment of the present disclosure.

FIG. 1 shows an example of a turbomachine engine 100, according to an embodiment of the present disclosure. Types of such engines include turboprops, turbofans, turbomachines, and turbojets. The turbomachine engine 100 is a ducted engine covered by a protective cowl 105, so that the only component visible in this exterior view is a fan assembly 110. A nozzle, not visible in FIG. 1, also protrudes from the aft end of the turbomachine engine 100 beyond the protective cowl 105.

Figure 2:
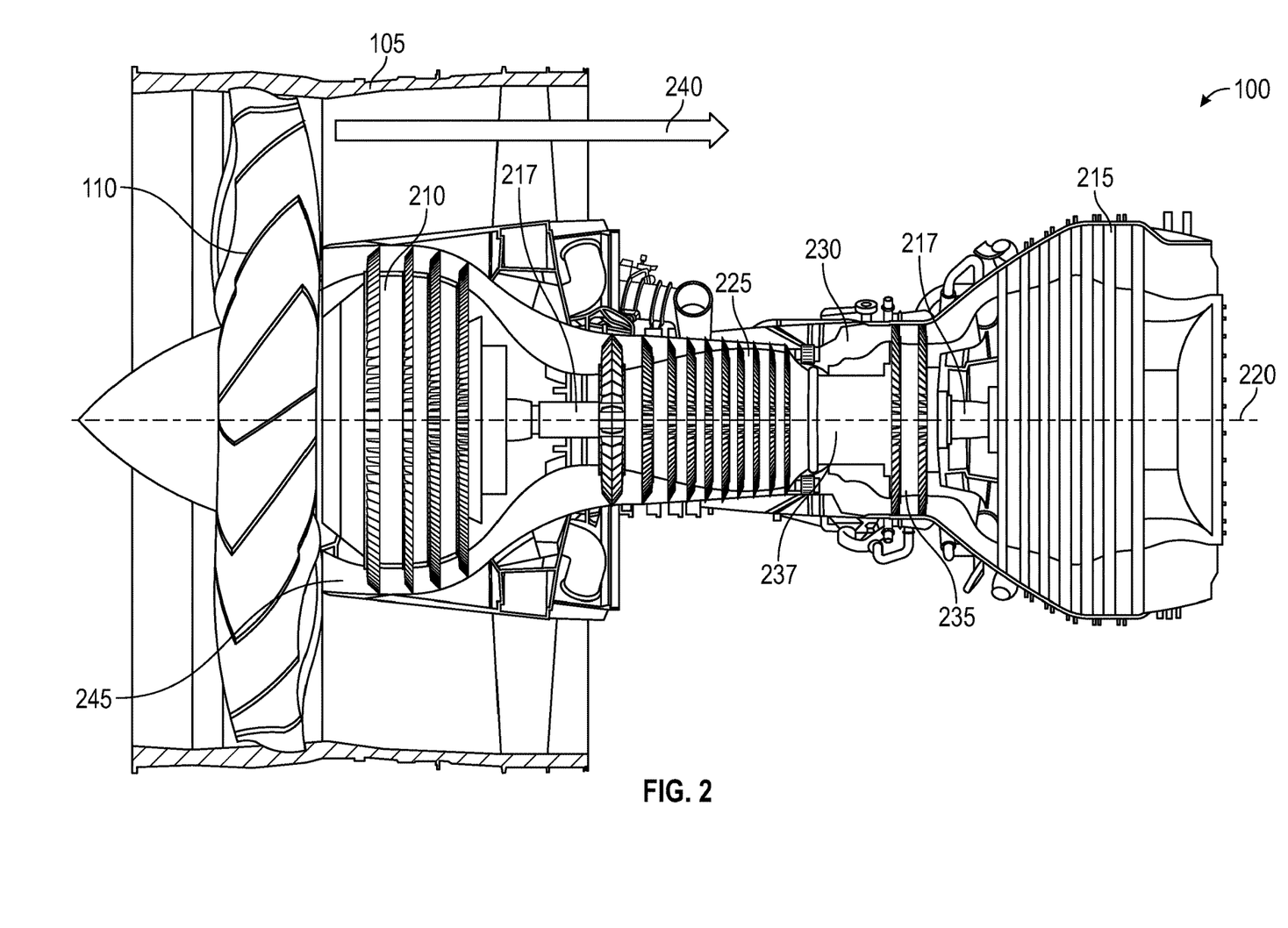
FIG. 2 shows a schematic, cross-sectional view taken along line 2-2 of the turbomachine engine shown in FIG. 1.

FIG. 2 shows a schematic, cross-sectional view taken along line 2-2 of the turbomachine engine 100 shown in FIG. 1, which may incorporate one or more embodiments of the present disclosure. In this example, the turbomachine engine 100 is a two-spool turbomachine that includes a high-speed system and a low-speed system, both of which are fully covered by the protective cowl 105. The low-speed system of the turbomachine engine 100 includes the fan assembly 110, a low-pressure compressor 210 (also referred to as a booster), and a low-pressure turbine 215, all of which are coupled to a low-pressure shaft 217 (also referred to as the low-pressure spool) that extends between the low-speed system components along the centerline axis 220 of the turbomachine engine 100. The low-pressure shaft 217 enables the fan assembly 110, the low-pressure compressor 210, and the low-pressure turbine 215 to rotate in unison about the centerline axis 220.

The high-speed system of the turbomachine engine 100 includes a high-pressure compressor 225, a combustor 230, and a high-pressure turbine 235, all of which are coupled to a high-pressure shaft 237 that extends between the high-speed system components along the centerline axis 220 of the turbomachine engine 100. The high-pressure shaft 237 enables the high-pressure compressor 225 and the high-pressure turbine 235 to rotate in unison about the centerline axis 220, at a different rotational speed than the rotation of the low-pressure components (and, in some embodiments, at a higher rotational speed, and/or a counter-rotating direction, relative to the low-pressure system).

The components of the low-pressure system and the high-pressure system are positioned so that a portion of the air taken in by the turbomachine engine 100 flows through the turbomachine engine 100 in a flow path from fore to aft through the fan assembly 110, the low-pressure compressor 210, the high-pressure compressor 225, the combustor 230, the high-pressure turbine 235, and the low-pressure turbine 215. Another portion of the air intake by the turbomachine engine 100 bypasses the low-pressure system and the high-pressure system, and flows from fore to aft as shown by arrow 240.

This portion of air entering the flow path of the turbomachine engine 100 is supplied from an inlet 245. For the embodiment shown in FIG. 2, the inlet 245 has an annular or an axisymmetric three hundred sixty-degree configuration, and provides a path for incoming atmospheric air to enter the turbomachinery flow path, as described above. Such a location may be advantageous for a variety of reasons, including management of icing performance as well as protecting the inlet 245 from various objects and materials as may be encountered in operation. In other embodiments, however, the inlet 245 may be positioned at any other suitable location, e.g., arranged in a non-axisymmetric configuration.

The combustor 230 is located between the high-pressure compressor 225 and the high-pressure turbine 235. The combustor 230 can include one or more configurations for receiving a mixture of fuel from a fuel system (not shown in FIG. 2) and air from the high-pressure compressor 225. This mixture is ignited by an ignition system (not shown in FIG. 2), creating hot combustion gases that flow from fore to aft through the high-pressure turbine 235, which provides a torque to rotate the high-pressure shaft 237 and, thereby, to rotate the high-pressure compressor 225. After exiting the high-pressure turbine, the combustion gases continue to flow from fore to aft through the low-pressure turbine 215, which provides a torque to rotate the low-pressure shaft 217 and, thereby, to rotate the low-pressure compressor 210 and the fan assembly 110.

In other words, the forward stages of the turbomachine engine 100, namely, the fan assembly 110, the low-pressure compressor 210, and the high-pressure compressor 225, all prepare the intake air for ignition. The forward stages all require power in order to rotate. The rear stages of the turbomachine engine 100, namely, the combustor 230, the high-pressure turbine 235, and the low-pressure turbine 215, provide that requisite power, by igniting the compressed air and using the resulting hot combustion gases to rotate the low-pressure shaft 217 and the high-pressure shaft 237 (also referred to as rotors). In this manner, the rear stages use air to physically drive the front stages, and the front stages are driven to provide air to the rear stages.

As the exhaust gas exits out of the aft end of the rear stages, the exhaust gas reaches the nozzle at the aft end of the turbomachine engine 100 (not shown in FIG. 2). When the exhaust gases pass over the nozzle, and combine with the bypassed air that is also being driven by the fan assembly 110, an exhaust force is created that is the thrust generated by the turbomachine engine 100. This thrust propels the turbomachine engine 100, and, for example, an aircraft to which the turbomachine engine 100 may be mounted, in the forward direction.

As in the embodiment shown in FIG. 2, the fan assembly 110 is located forward of the low-pressure turbine 215 in a "puller" configuration, and the exhaust nozzle is located aft. As is depicted, the fan assembly 110 is driven by the low-pressure turbine 215, and, more specifically, is driven by the low-pressure shaft 217. More specifically, the turbomachine engine 100 in the embodiment shown in FIG. 2 includes a power gearbox (not shown in FIG. 2), and the fan assembly 110 is driven by the low-pressure shaft 217 across the power gearbox. The power gearbox may include a gearset for decreasing a rotational speed of the low-pressure shaft 217 relative to the low-pressure turbine 215, such that the fan assembly 110 may rotate at a slower rotational speed than does the low-pressure shaft 217. Other configurations are possible and contemplated within the scope of the present disclosure, such as what may be termed a "pusher" configuration embodiment in which the low-pressure turbine 215 is located forward of the fan assembly 110.

The turbomachine engine 100 depicted in FIGS. 1 and 2 is by way of example only. In other embodiments, the turbomachine engine 100 may have any other suitable configuration, including, for example, any other suitable number of shafts or spools, fan blades, turbines, compressors, etc., and the power gearbox may have any suitable configuration, including, for example, a star gear configuration, a planet gear configuration, a single-stage, a multi-stage, epicyclic, non-epicyclic, etc. The fan assembly 110 may be any suitable fixed-pitched assembly or variable-pitched assembly. The turbomachine engine 100 may include additional components not shown in FIGS. 1 and 2, such as vane assemblies and/or guide vanes, etc.

Figure 3:
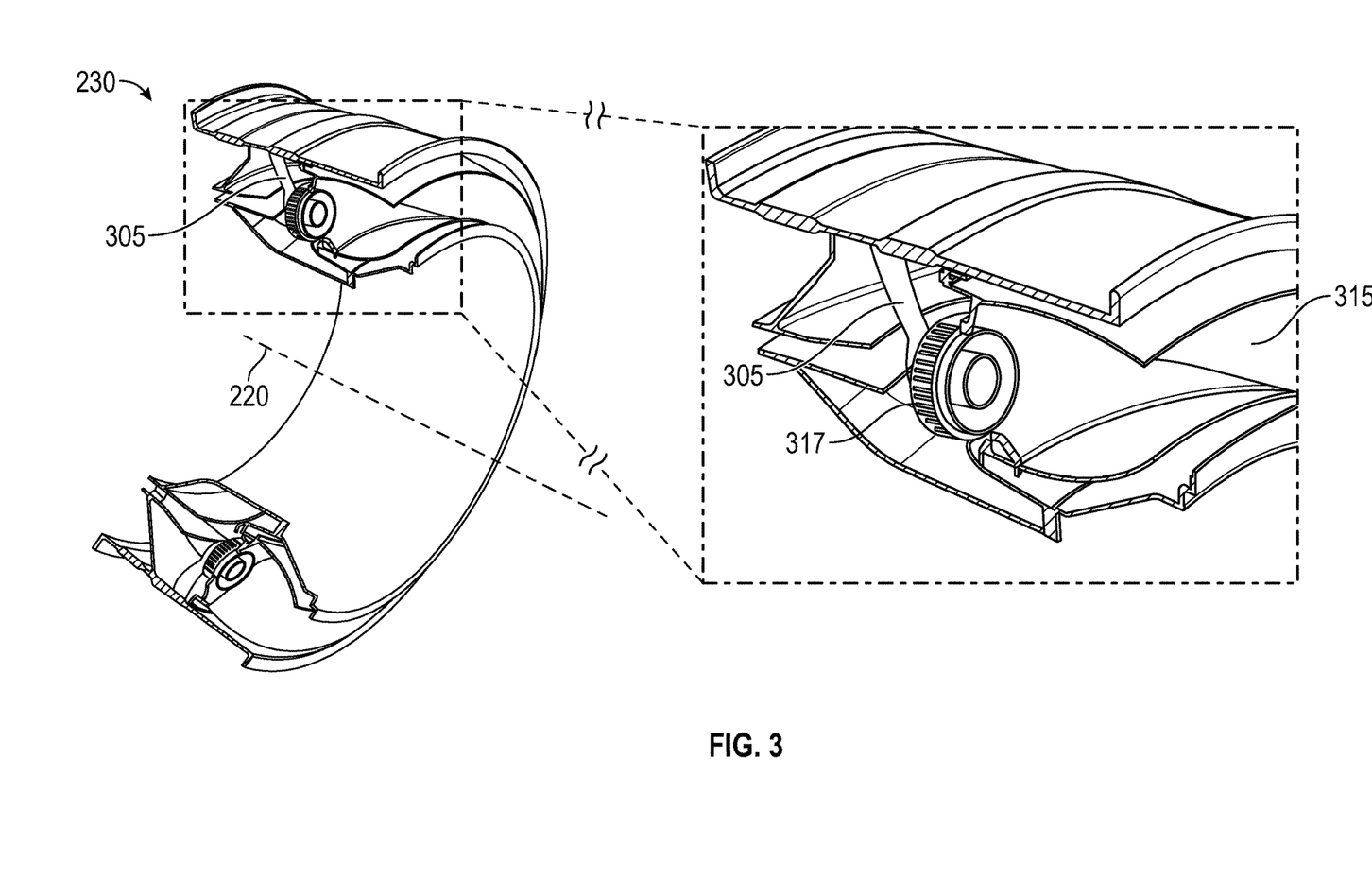
FIG. 3 shows a partial section view of a combustor.

FIG. 3 shows a partial section view of a combustor 230. The combustor 230 has an annular shape with axial symmetry about the centerline axis 220 that defines an axial direction. The combustor 230 also has an annular ring of fuel nozzles 305 spaced along the circumference (also referred to as the circumferential direction) and facing in the aft direction.

Compressed air from the front stages of the turbomachine engine 100 flows into the combustor 230 and mixes in a combustion chamber 315 with fuel from the fuel nozzles 305. Each fuel nozzle 305 delivers fuel into a separate region (referred to as a cup) of the total annular volume of the combustion chamber 315, in accordance with a desired performance of the combustor 230 at various engine operating states. The air enters the combustion chamber 315 from swirlers 317 that surround each fuel nozzle 305, as well as through cooling holes in the inner and the outer surfaces (also referred to as liners) of the combustion chamber 315. The fuel-air mixture is ignited in the combustion chamber 315 to produce a steady flow of combustion gases that enter the turbines in the rear stages.

Figure 4:
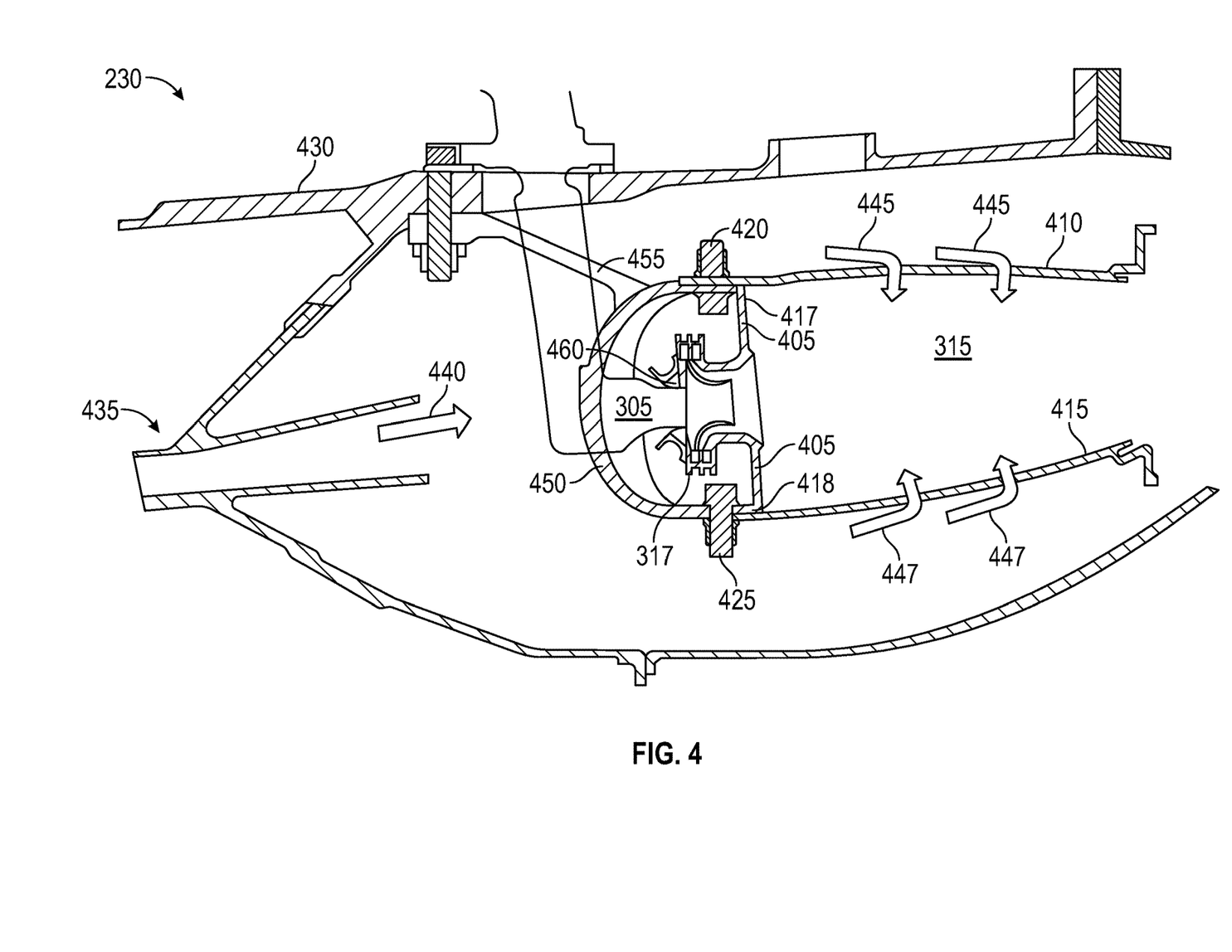
FIG. 4 shows a schematic section view of a combustion chamber.

FIG. 4 shows a schematic section view of a combustion chamber 315. This view shows a cross-sectional view through the midplane of a single cup, along the axial length. The combustion chamber 315 is an annular open space around the centerline axis 220 (FIG. 2) that is bounded at the forward end by a dome 405 which supports and positions the fuel nozzle 305, an outer liner 410 on the outer annular surface, and an inner liner 415 on the inner annular surface. The outer liner 410 and the inner liner 415 are coaxial cylindrical surfaces around the centerline axis 220, the outer liner 410 being spaced radially outward from the inner liner 415. The dome 405 is oriented perpendicular to the axis of the swirler 317 and is symmetric around the centerline axis 220, with openings spaced along the circumference to receive each fuel nozzle 305. Because of its proximity to the combustion chamber, hot gases, and the extreme temperatures produced therein, the dome 405 must be configured to withstand a harsh environment. The combustion chamber 315 is open in the aft direction, to allow combustion gases to flow towards the high-pressure turbine 235 (FIG. 2).

The outer liner 410 and the inner liner 415 have a cylindrical shape with rotational symmetry around the centerline axis 220 (FIG. 2), the outer liner 410 having a radius greater than that of the inner liner 415. Both the outer liner 410 and the inner liner 415 extend in the aft direction along the centerline axis 220, with cooling holes (not shown in FIG. 4) along their surface to allow additional air from the high-pressure compressor 225 (shown in FIG. 2) to mix with the fuel in the combustion chamber 315. Each liner has a cold side, which is the surface outside the combustion chamber 315 through which air enters the cooling holes, and a hot side, which is the surface inside the combustion chamber through which air exits the cooling holes.

In the example of FIG. 4, the dome 405, the outer liner 410, and the inner liner 415 are all made of metal, though in some embodiments at least portions of the outer liner 410 and the inner liner 415 may alternatively be made of ceramic matrix composite materials. The liners may include integrally joined portions that are mechanically joined using an overlapping portion according to one embodiment. In other embodiments, the liners are formed in an additive manufacturing process as one unitary body.

The dome 405 and the outer liner 410 are coupled together at an outer wall 417 of the dome 405, and the dome 405 and the inner liner 415 are coupled together at an inner wall 418 of the dome 405 with arrays 420, 425 of fasteners. The fasteners in the arrays 420, 425 may include one or more of pins, bolts, nuts, nut plates, screws, and any other suitable types of fasteners. The arrays 420, 425 also serve to couple the dome 405, the outer liner 410, and the inner liner 415 to a support structure 430 of the combustor 230.

The support structure 430 defines an inlet, also referred to as a diffuser 435, for compressed air to flow from the high-pressure compressor 225 (shown in FIG. 2), from fore to aft as shown by arrow 440, and into the combustion chamber 315 through the swirler 317 positioned around the fuel nozzle 305. The air also flows into the combustion chamber 315 through dilution holes (not shown in FIG. 4) in the outer liner 410 (e.g., along arrows 445) and through dilution holes (not shown in FIG. 4) in the inner liner 415 (e.g., along arrows 447). In addition, one or more heat shields and/or deflectors (not shown in FIG. 4) may also be provided on the dome 405 to help to protect the dome 405 from the heat of the combustion gases.

In addition, the support structure 430 supports the dome 405 with a mounting arm 455 that connects to a cowl 450, which has an annular shape that is symmetric about the centerline axis 220, forming an aft-facing channel to receive the dome 405, and having a forward-facing aperture to receive the fuel nozzle 305. The cowl 450 may be a single piece design, as shown in FIG. 4, having multiple openings around the circumference to receive each fuel nozzle 305. Alternatively, the cowl 450 may be a two-piece design or a split-cowl design, with an inner cowl (not shown in FIG. 4) and an outer cowl (not shown in FIG. 4), each having an annular shape that is symmetric about the centerline axis 220, and positioned to define a gap between them through which each fuel nozzle 305 may extend towards the combustion chamber 315.

The cowl 450 is coupled directly to the outer wall 417 and the inner wall 418 of the dome 405 by the arrays 420, 425 of fasteners. The cowl 450 may distribute the airflow aerodynamically between the dome 405 containing the ferrule 460 and the swirler 317, and around the inner liner 415 and the outer liner 410 surrounding the combustion chamber 315. The ferrule 460 is configured to center the fuel nozzle 305 with the swirler 317. Other suitable structural configurations are contemplated.

Figure 5:
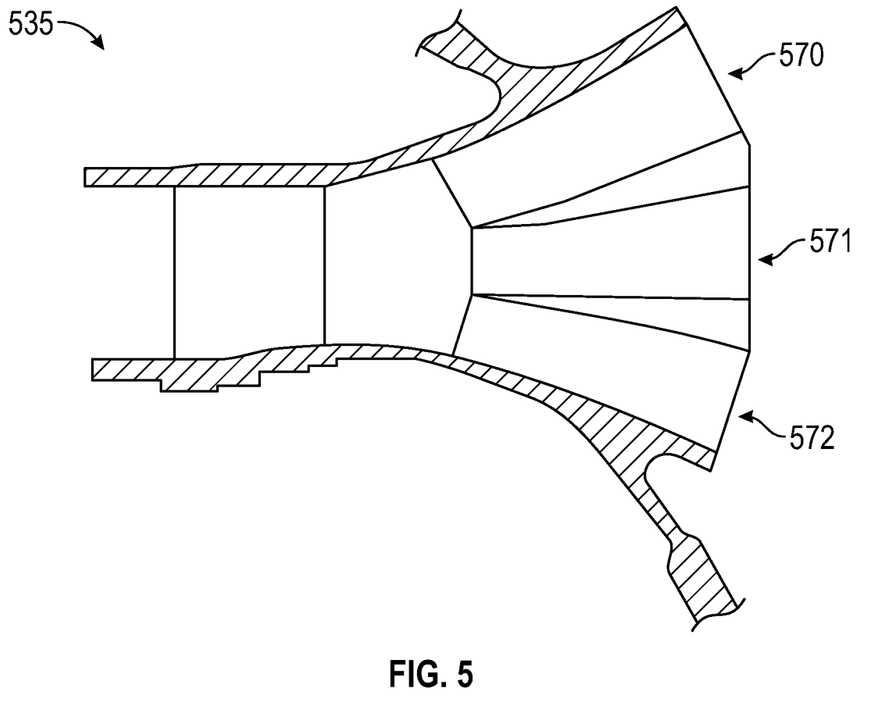
FIG. 5 shows a schematic section view of a multi-pass diffuser.

FIG. 5 shows a schematic section view of a multi-pass diffuser 535. The multi-pass diffuser 535 has multiple channels 570, 571, and 572 that direct airflow to different parts of the combustor 230. For example, outer channel 570 can be configured to direct airflow towards the outer liner 410, the inner channel 572 can be configured to direct airflow towards the inner liner 415, and the center channel 571 can be configured to direct airflow towards the dome 405 containing the ferrule 460 and the swirler 317, while directing air away from obstructing components such as the fuel nozzle 305. The multi-pass diffuser 535 is heavier and more complex to manufacture than is the diffuser 435, due to the weight of the additional material required to form the multiple channels 570, 571, and 572. Due to the added weight, the multi-pass diffuser 535 is therefore not suitable as a universal solution for improved air flow in all engine designs.

Some embodiments provide diffusers with streamlined openings, referred to as passlets, to guide the flow of air directly towards combustor components (e.g., into liner passages). These passlets create a suction effect that pulls the boundary layer of flowing air towards to the diffuser wall, keeping the flow attached to the wall and preventing flow separation. By directly feeding the flow into the liner passages, the overall pressure loss can be reduced, which allows shorter diffuser length, less operational loss, reduced engine weight, higher specific fuel consumption, and a shorter engine shaft for improved dynamics and performance. The distance between the diffuser and the fuel nozzle (referred to as the dump length) can also be reduced, since the passlets can directly guide the flow into the liner passages, to further reduce engine overall length.

In some embodiments, the passlet is an embedded opening in the diffuser surface, formed by removing material therefrom, and is configured to cause air to flow in a direction away from the primary diffuser passage towards specific components of the combustor. This embedded design maintains the single-pass simplicity of the diffuser 435, by cutting out the passlets from the diffuser surface, and mimics the function of the multi-pass diffuser 535 without the associated complexity and weight penalty.

The passlets may be configured to cause air to flow towards combustor components, such as the inner liner and the outer liner. In some embodiments, the passlets can also be flexibly configured to cause air to flow away from combustor components, for example, to mitigate fuel nozzle and liner support blockage effects, and, thereby, further lower overall pressure loss. Blockages may arise from structural obstructions, such as the dome, mounts, cowl, etc.

By guiding the high-pressure flow directly to align with the passages, the passlets allow better pressure recovery. In addition, the passlets can be aligned to guide more flow towards hot spots in the liners for supplemental cooling. Furthermore, the passlets can also be distributed circumferentially in a uniform pattern or a non-uniform pattern to meet air flow distribution needs.

Figure 6:
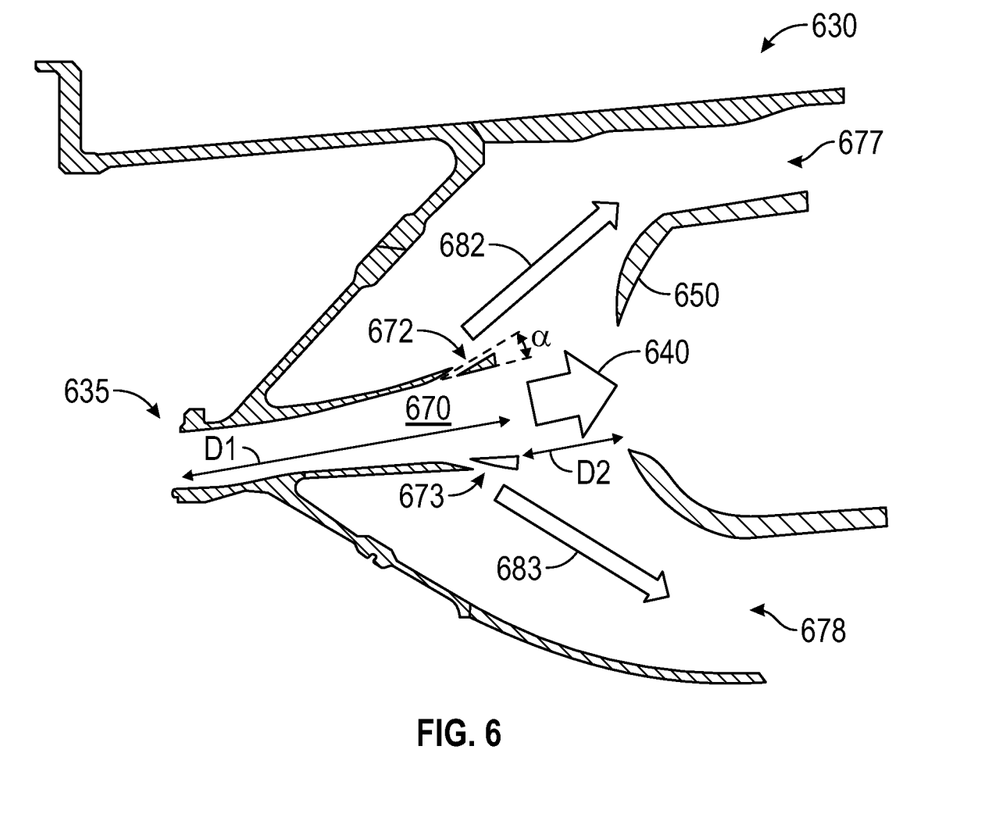
FIG. 6 shows a schematic section view of a combustor of some embodiments having a diffuser with embedded passlets.

FIG. 6 shows a schematic section view of a combustor 630 of some embodiments having a diffuser 635 with embedded passlets 672, 673. Air flows along a pathway indicated by arrow 640 towards the cowl 650 through a primary diffuser passage 670, with additional flows through the outer passlet 672 and the inner passlet 673 towards the outer passage 677 and the inner passage 678, respectively. The airflow pathway from the outer passlet 672 to the outer passage 677 is indicated by arrow 682, and the airflow pathway from the inner passlet 673 to the inner passage 678 is indicated by arrow 683.

The pattern of passlet placement that is illustrated in FIG. 6 is not limited to a single row layout (as shown). In some embodiments, the passlets can also be arranged in a multi-row layout (not shown in FIG. 6), from forward to aft, to meet different bleed flow and passage flow requirements for different engines. Moreover, the circumferential position of passlets in one row may or may not be aligned with the circumferential position of passlets in other rows.

In the example of FIG. 6, the length of the diffuser 635 is indicated by arrow D1. The dump length, defined as the distance between the end of the diffuser 635 and the fuel nozzle (not shown in FIG. 6) is indicated by arrow D2. The lengths D1, D2 are shorter due to the passlets than in the example of the multi-pass diffuser 535.

In some embodiments, a passlet opening has a variable thickness profile through the diffuser wall. The thickness profile is defined as the change in width (e.g., tapering) of the diffuser wall along the diffuser length due to the passlet opening. The thickness profile can be varied to configure the opening to cause air to flow as desired to different parts of the combustor. For example, the thickness profile can be configured to define a passlet angle $\alpha$ as shown in FIG. 6, that can be varied circumferentially to better feed different combustor parts, e.g., using a steep angle for forward bleeds, a shallow angle for downstream passages, etc.

In some embodiments, passlet openings may be different geometric shapes, including, but not limited to, rectangular, square, circular, oval, or triangular shapes. For example, in some embodiments, passlet openings may be embedded slots, whose length and width can also be varied to guide diffuser flow towards areas where more flow is needed. The slot may have a width that extends partially around the circumference of the diffuser, and a length that extends along the diffuser passage. For example, the width of the slot may be greater than the length of the slot.

Figure 7:
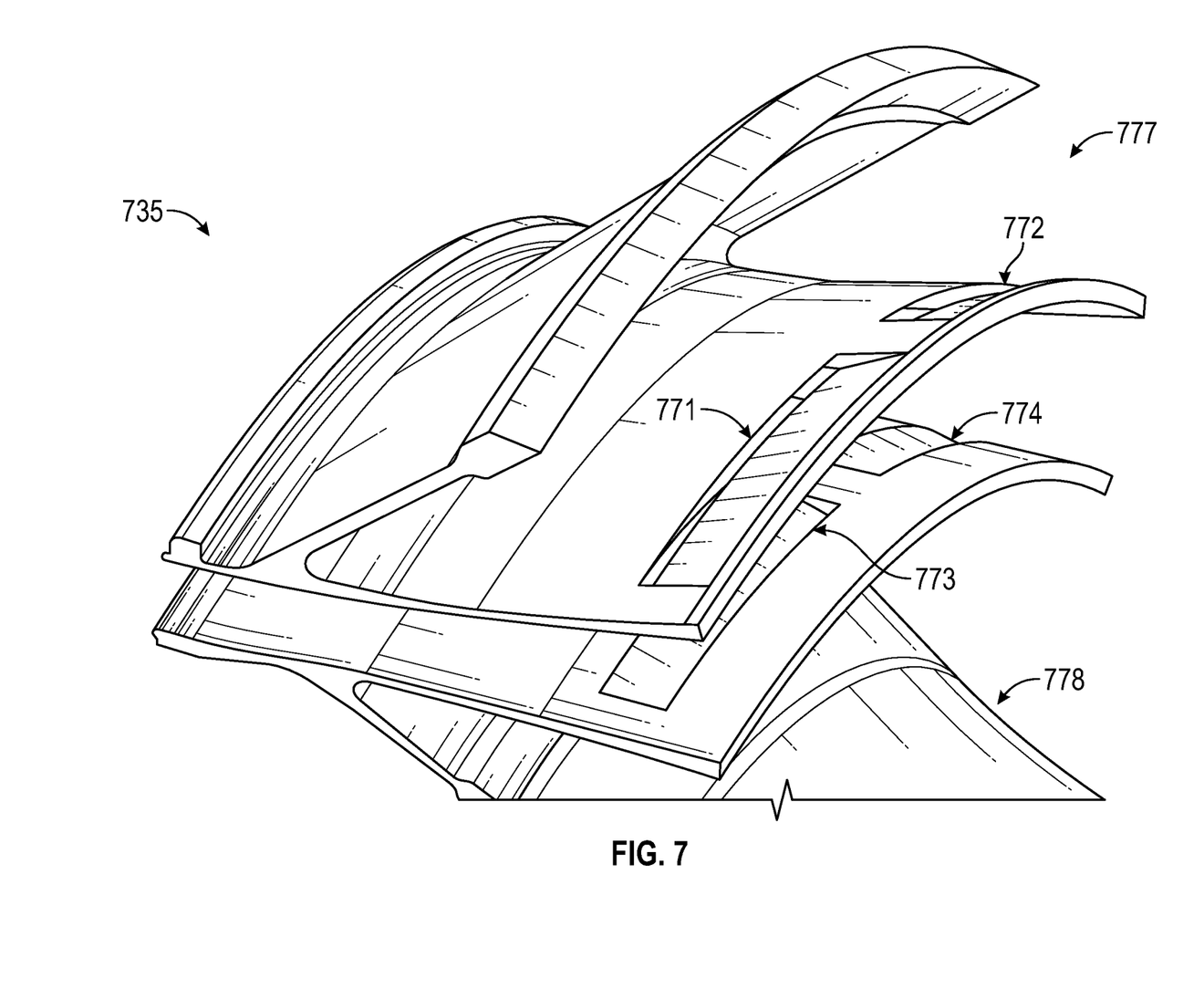
FIG. 7 shows a perspective view of a section of a diffuser of some embodiments with embedded passlets.

FIG. 7 shows a perspective view of a section of a diffuser 735 of some embodiments with embedded passlets 771, 772, 773, 774. In this example, the outer passlets 771, 772 are embedded rectangular slots that are positioned circumferentially, with a thickness profile that is configured to direct air to the outer passage 777. The inner passlets 773, 774 are embedded rectangular slots that are positioned circumferentially, with a thickness profile that is configured to direct air to the inner passage 778. The length and the width of the slots are defined to facilitate optimal airflow, and depend on the specific geometry of the combustor design. The spacing between the outer passlets 771, 772 and between the inner passlets 773, 774 is chosen in this example to avoid the obstruction of the fuel nozzle (not shown).

In some embodiments, embedded passlets may include one or more flaps that extend from the edge of the passlet opening, away from the diffuser passage. For example, an extended passlet may have two flaps, one aft of the opening and another forward of the opening. Other passlets may only have a single flap. The length and the angle of each flap relative to the diffuser surface can also be varied. For example, for a passlet with two flaps, the flaps may have converging angles, diverging angles, or be parallel. Moreover, for a passlet with two flaps, the flaps may have an equal length or an unequal length. Extended passlets may provide improved diffusion compared to embedded passlets alone, and can achieve flow performance that is more akin to multi-pass diffusers. In some cases, only one specific passlet or a subset of passlets in the diffuser may be extended with flaps, to provide more targeted flow to specific areas of the combustor.

Figure 8:
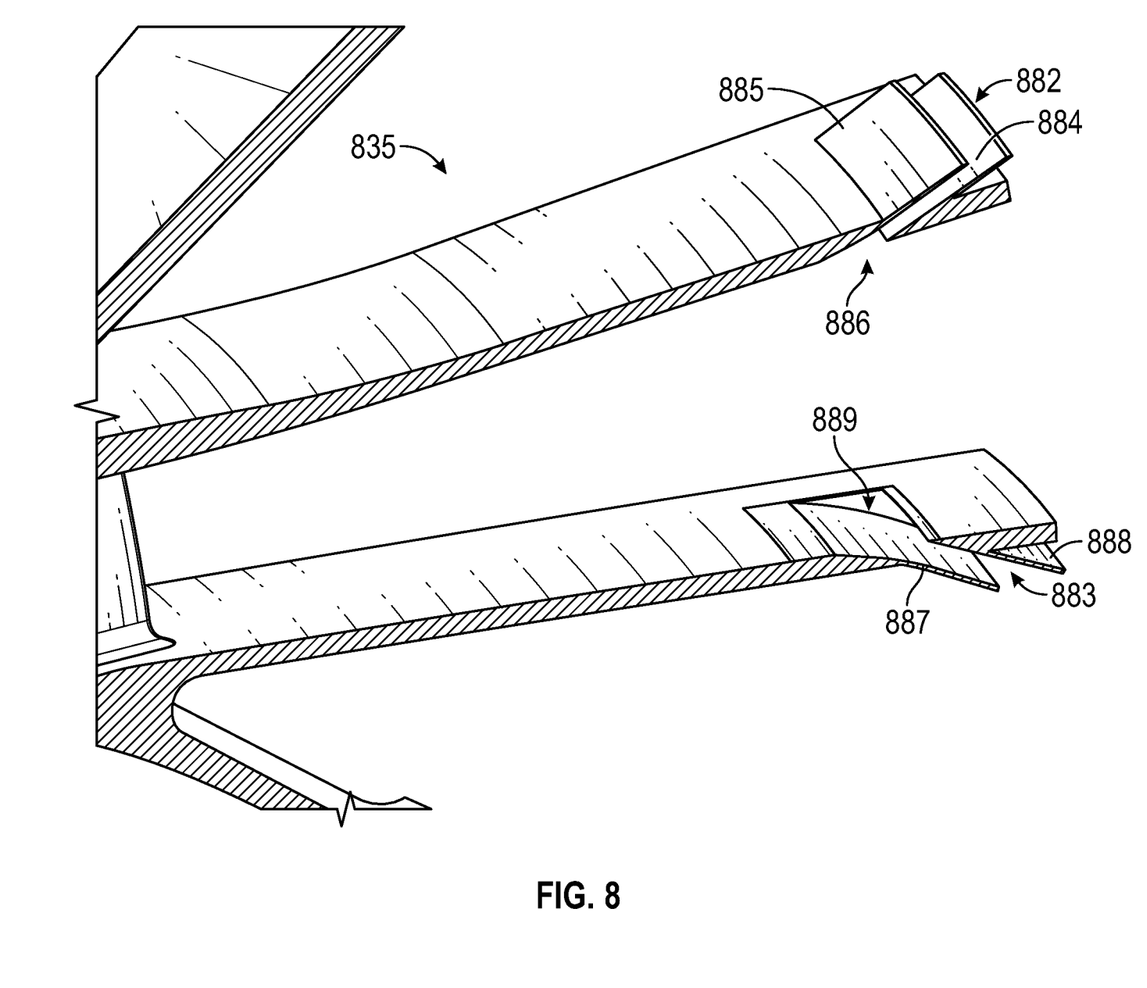
FIG. 8 shows a perspective view of a section of a diffuser of some embodiments with an extended outer passlet and an extended inner passlet.

FIG. 8 shows a perspective view of a section of a diffuser 835 of some embodiments with an extended outer passlet 882 and an extended inner passlet 883. In this example, the extended outer passlet 882 has two flaps 884, 885 that extend outwards on opposite sides of the opening for an embedded outer passlet 886. The extended inner passlet 883 also has two flaps 887, 888 that extend outwards on opposite sides of the opening for an embedded inner passlet 889. The angles of the embedded outer passlet 886, the embedded inner passlet 889, and the flaps 884, 885, 887, 888 are configured to direct the flow of air as described above.

In this example, the angles of the flaps 884, 885 are the same as the angle of the embedded outer passlet 886, though, in other cases, the angles of the flaps 884, 885, and the angle of the embedded outer passlet 886 may be varied to achieve different airflow characteristics. The distance between flaps 884, 885 is constant in this example because the flaps 884, 885 have the same angle relative to the outer surface of the diffuser 835. In other cases, the angles of the flaps 884, 885 could be varied so that the distance between them increases (creating a divergent profile) or decreases (creating a convergent profile).

Likewise, the angle of the embedded inner passlet 889 and the angles of the flaps 887, 888 are configured to direct the flow of air as described above. In this example, the angles of the flaps 887, 888 are the same as the angle of the embedded inner passlet 889, though, in other cases, the angles of the flaps 887, 888 and the angle of the embedded inner passlet 889 may be varied to achieve different airflow characteristics. The distance between the flaps 887, 888 is constant in this example because the flaps 887, 888 have the same angle relative to the inner surface of the diffuser 835. In other cases, the angles of the flaps 887, 888 could be varied so that the distance between them increases (creating a divergent profile) or decreases (creating a convergent profile).

In some embodiments, the passlets include tubes that extend from the embedded passlet opening, away from the diffuser passage. Each passlet tube can be characterized by a height of extension away from the passage at an angle, the height and the angle being configured to cause air to flow to combustor components. In some embodiments, the passlet tubes may have a cross section with different geometric shapes, including, but not limited to, rectangular, square, circular, oval, or triangular shapes. The cross section of the passlet tube may also be convergent or divergent as required for different airflow characteristics. The passlet tube can also be characterized by a width that extends partially around the circumference of the diffuser, and a length that extends along the diffuser passage. The length and the width of the passlet tube can also be varied to guide diffuser flow towards areas where more flow is needed. For example, the width of the passlet tube may be greater than the length of the passlet tube.

Figure 9:
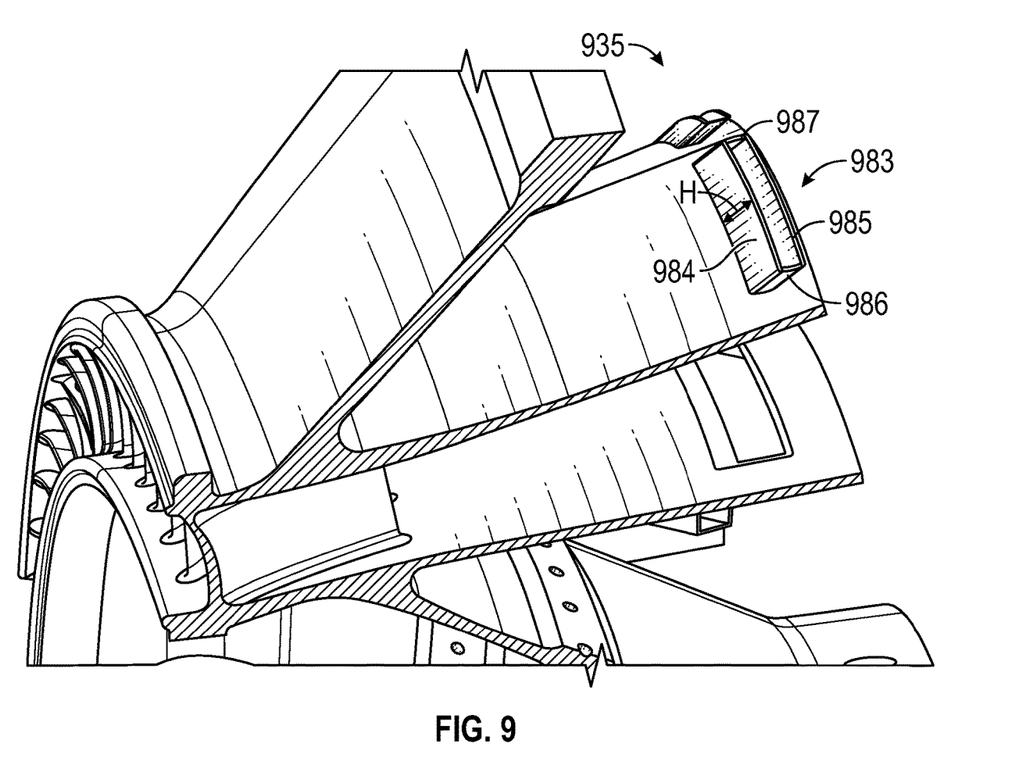
FIG. 9 shows a perspective view of a section of a diffuser of some embodiments with a passlet tube.

FIG. 9 shows a perspective view of a section of a diffuser 935 of some embodiments with a passlet tube 983. In this example, the passlet tube 983 has a height H above the surface of the diffuser 935, and a rectangular cross section, defined by a forward wall 984, an aft wall 985, and side walls 986, 987. The cross section is constant in this example because the walls 984 to 987 have the same angle relative to the surface of the diffuser 935. In other cases, the angles of the walls 984 to 987 could be varied so that the cross section of the passlet tube 983 increases (creating a divergent profile) or decreases (creating a convergent profile). All four walls 984 to 987 have the same height H in this example, though the height could also be varied by wall or pairs of walls. In other embodiments, the passlet tube 983 could have fewer than four walls, for example, having a circular cross section with a single wall, a teardrop cross section with two walls, a triangular cross section with three walls, etc. In still other embodiments, the passlet tube 983 could have more than four walls, such as five walls for a pentagonal cross section, six walls for a hexagonal cross section, etc.

Any of the various features discussed with any one of the embodiments discussed herein may also apply to and be used with any other embodiments. Further aspects of the present disclosure are provided by the subject matter of the following clauses.

A diffuser for a combustor of a turbomachine engine includes a body having a first annular surface and a second annular surface that define a passage. The passage is configured to cause air to flow along the passage to a first component of the combustor. The first annular surface includes an opening that is configured to cause air to flow in a direction away from the passage to a second component of the combustor.

The diffuser of the preceding clause, where the second component of the combustor is at least one of an outer passage and an outer liner.

The diffuser of any preceding clause, where the second component of the combustor is at least one of an inner passage and an inner liner.

The diffuser of any preceding clause, where the opening has a shape that is one of rectangular and oval.

The diffuser of any preceding clause, where the opening is defined by removing a portion of the first annular surface.

The diffuser of any preceding clause, where the first annular surface has a thickness. The opening has a variable thickness profile through the first annular surface. The variable thickness profile is defined to configure the opening to cause air to flow to the second component of the combustor.

The diffuser of any preceding clause, where the first component of the combustor is one of a dome and a swirler. The first annular surface is symmetric around a centerline axis of the turbomachine engine. The second annular surface is symmetric around the centerline axis. The passage has a length that is parallel to the centerline axis and that is defined by a common length of the first annular surface and the second annular surface.

The diffuser of any preceding clause, where the opening is a first opening. The second annular surface includes a second opening that is configured to cause air to flow to a third component of the combustor.

The diffuser of any preceding clause, where the third component of the combustor is at least one of an outer passage and an outer liner.

The diffuser of any preceding clause, where the third component of the combustor is at least one of an inner passage and an inner liner.

The diffuser of any preceding clause, where the opening is further configured to cause air to flow away from a third component of the combustor.

The diffuser of any preceding clause, where the third component of the combustor is at least one of a dome, a mount, a cowl, and a fuel nozzle.

The diffuser of any preceding clause, where the opening is a slot that extends partially around a circumference of the first annular surface. The slot has a width that extends along the circumference of the first annular surface. The slot has a length that extends along the passage.

The diffuser of any preceding clause, where the width of the slot is greater than the length of the slot.

The diffuser of any preceding clause, where the first annular surface includes a flap that extends from an edge of the opening, in the direction away from the passage.

The diffuser of any preceding clause, where the edge is a first edge, and the flap is a first flap. The first annular surface includes a second flap that extends from a second edge of the opening, in the direction away from the passage.

The diffuser of any preceding clause, where the flap extends in the direction away from the passage at an angle. The angle is defined to configure the opening to cause air to flow to the second component of the combustor.

The diffuser of any preceding clause, where the first annular surface includes a tube that extends from the opening in the direction away from the passage.

The diffuser of any preceding clause, where the tube has a height that extends away from the passage at an angle. The angle is defined to configure the opening to cause air to flow to the second component of the combustor.

The diffuser of any preceding clause, where the tube has a shape that is one of rectangular and an oval. The tube has a width that extends along a circumference of the first annular surface. The tube has a length that extends along the passage.

A turbomachine engine includes a combustor and a diffuser in flow communication with the combustor. The diffuser has a body that includes a first annular surface and a second annular surface that define a passage therebetween, the passage being configured to cause air to flow along the passage toward a first component of the combustor. The first annular surface includes an opening that is configured to cause air to flow in a direction away from the passage toward a second component of the combustor.

The turbomachine engine of the preceding clause, the combustor including an outer liner and an inner liner. The outer liner defines an outer passage and the inner liner defines an inner passage. The second component of the combustor is at least one of the outer passage, the inner passage, the outer liner, and the inner liner.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A diffuser in flow communication with a combustor of a turbomachine engine, the combustor comprising a dome, an outer liner, and an inner liner, the diffuser comprising:
    an outer annular wall having a radially outer surface and a radially inner surface; and
    an inner annular wall having a radially outer surface and a radially inner surface, the radially outer surface of the inner annular wall and the radially inner surface of the outer annular wall together defining a primary passage therebetween, the primary passage extending in an aft direction of the diffuser from a forward end of the diffuser and through an aft end of the diffuser, the aft end of the diffuser being disposed at an axial distance from the dome of the combustor, such that air flows in the aft direction along the primary passage toward the dome,
    wherein the outer annular wall defines an outer passlet that extends into the radially inner surface and through the radially outer surface thereof, such that a first portion of the air within the primary passage flows through the outer passlet in a first direction and exits toward a radially outer surface of the outer liner of the combustor, the first direction being at a first angle relative to the aft direction, the outer passlet extending partially around a circumference of the outer annular wall and a downstream end thereof being spaced from a downstream end of the outer annular wall,
    wherein the inner annular wall defines an inner passlet that extends into the radially outer surface and through the radially inner surface thereof, such that a second portion of the air within the primary passage flows through the inner passlet in a second direction and exits toward a radially inner surface of the inner liner of the combustor, the second direction being at a second angle relative to the aft direction, the inner passlet extending partially around a circumference of the inner annular wall and a downstream end thereof being spaced from a downstream end of the inner annular wall,
    wherein an outer passage of the combustor is partially defined by the radially outer surface of the outer liner, and an inner passage of the combustor is partially defined by the radially inner surface of the inner liner, and
    wherein the outer passlet is arranged such that the first portion of the air from the primary passage flows through the outer passlet towards the outer passage, and the inner passlet is arranged such that the second portion of the air from the primary passage flows through the inner passlet towards the inner passage.

2. The diffuser of claim 1, wherein at least one of the outer passlet or the inner passlet has a shape that is rectangular or oval.

3. The diffuser of claim 1, wherein the outer annular wall has a thickness defined between the radially inner surface and the radially outer surface thereof, and the outer passlet has a variable thickness profile through the outer annular wall.

4. The diffuser of claim 1, wherein the outer annular wall is symmetric around a centerline axis of the diffuser, the inner annular wall is symmetric around the centerline axis of the diffuser, and the primary passage has a length that is defined by a common length of the outer annular wall and the inner annular wall.

5. The diffuser of claim 1, wherein the outer annular wall includes a flap that extends from the radially outer surface thereof in the first direction and partially defines the outer passlet.

6. The diffuser of claim 5, wherein the flap is a first flap, and the outer annular wall further includes a second flap extending from the radially outer surface thereof in the first direction and axially spaced from the first flap, the first flap and the second flap together partially defining the outer passlet.

7. The diffuser of claim 1, wherein the inner annular wall has a thickness defined between the radially inner surface and the radially outer surface thereof, and the inner passlet has a variable thickness profile through the inner annular wall.

8. The diffuser of claim 1, wherein the inner annular wall includes a flap that extends from the radially inner surface thereof in the second direction and partially defines the inner passlet.

9. The diffuser of claim 8, wherein the flap is a first flap, and the inner annular wall further includes a second flap extending from the radially inner surface thereof in the second direction, the first flap and the second flap together partially defining the inner passlet.

10. The diffuser of claim 1, wherein the outer passlet has an outer passlet width that extends along the circumference of the outer annular wall and an outer passlet length that extends in the aft direction along the primary passage, and the inner passlet has an inner passlet width that extends along the circumference of the inner annular wall and an inner passlet length that extends in the aft direction along the primary passage.

11. The diffuser of claim 1, wherein the outer passlet and the inner passlet are disposed at an axial distance from the forward end of the diffuser.

12. The diffuser of claim 11, wherein the outer passlet and the inner passlet are disposed at an axial distance from the aft end of the diffuser and more toward the aft end than the forward end of the diffuser.

13. A turbomachine engine comprising:
a combustor comprising a dome, an outer liner, and an inner liner; and
a diffuser in flow communication with the combustor, the diffuser comprising:
an outer annular wall having a radially outer surface and a radially inner surface; and
an inner annular wall having a radially outer surface and a radially inner surface, the radially outer surface of the inner annular wall and the radially inner surface of the outer annular wall together defining a primary passage therebetween, the primary passage extending in an aft direction of the diffuser from a forward end of the diffuser and through an aft end of the diffuser, the aft end of the diffuser being disposed at an axial distance from the dome of the combustor, such that air flows in the aft direction along the primary passage toward the dome,
wherein the outer annular wall defines an outer passlet extending from the primary passage and through the radially outer surface thereof, such that the air from the primary passage flows through the outer passlet in a first direction at a first angle relative to the aft direction and exits toward a radially outer surface of the outer liner, the outer passlet extending partially around a circumference of the outer annular wall and a downstream end thereof being spaced from a downstream end of the outer annular wall,
wherein the inner annular wall defines an inner passlet extending from the primary passage and through the radially inner surface thereof, such that the air from the primary passage flows through the inner passlet in a second direction at a second angle relative to the aft direction and exits toward a radially inner surface of the inner liner, the inner passlet extending partially around a circumference of the inner annular wall and a downstream end thereof being spaced from a downstream end of the inner annular wall,
wherein an outer passage of the combustor is partially defined by the radially outer surface of the outer liner, and an inner passage of the combustor is partially defined by the radially inner surface of the inner liner, and
wherein the outer passlet is arranged such that the air from the primary passage flows through the outer passlet and exits into the outer passage, and the inner passlet is arranged such that the air from the primary passage flows through the inner passlet and exits into the inner passage.

14. The turbomachine engine of claim 13, wherein each of the outer passlet and the inner passlet has a variable thickness profile through the outer liner or the inner liner.

15. The turbomachine engine of claim 13, wherein the outer annular wall includes an outer flap that extends from the radially outer surface thereof and partially defines the outer passlet, and
wherein the inner annular wall includes an inner flap that extends from the radially inner surface thereof and partially defines the inner passlet.

16. The turbomachine engine of claim 15, wherein the outer flap is a first outer flap, and the outer annular wall further includes a second outer flap extending from the radially outer surface thereof, the first outer flap and the second outer flap together partially defining the outer passlet, and
wherein the inner flap is a first inner flap, and the inner annular wall further includes a second inner flap extending from the radially inner surface thereof, the first inner flap and the second inner flap together partially defining the inner passlet.

17. The turbomachine engine of claim 13, wherein the outer passlet has an outer passlet width that extends along the circumference of the outer annular wall and an outer passlet length that extends in the aft direction along the primary passage, and
wherein the inner passlet has an inner passlet width that extends along the circumference of the inner annular wall and an inner passlet length that extends in the aft direction along the primary passage.

* * * * *